Figure 1:
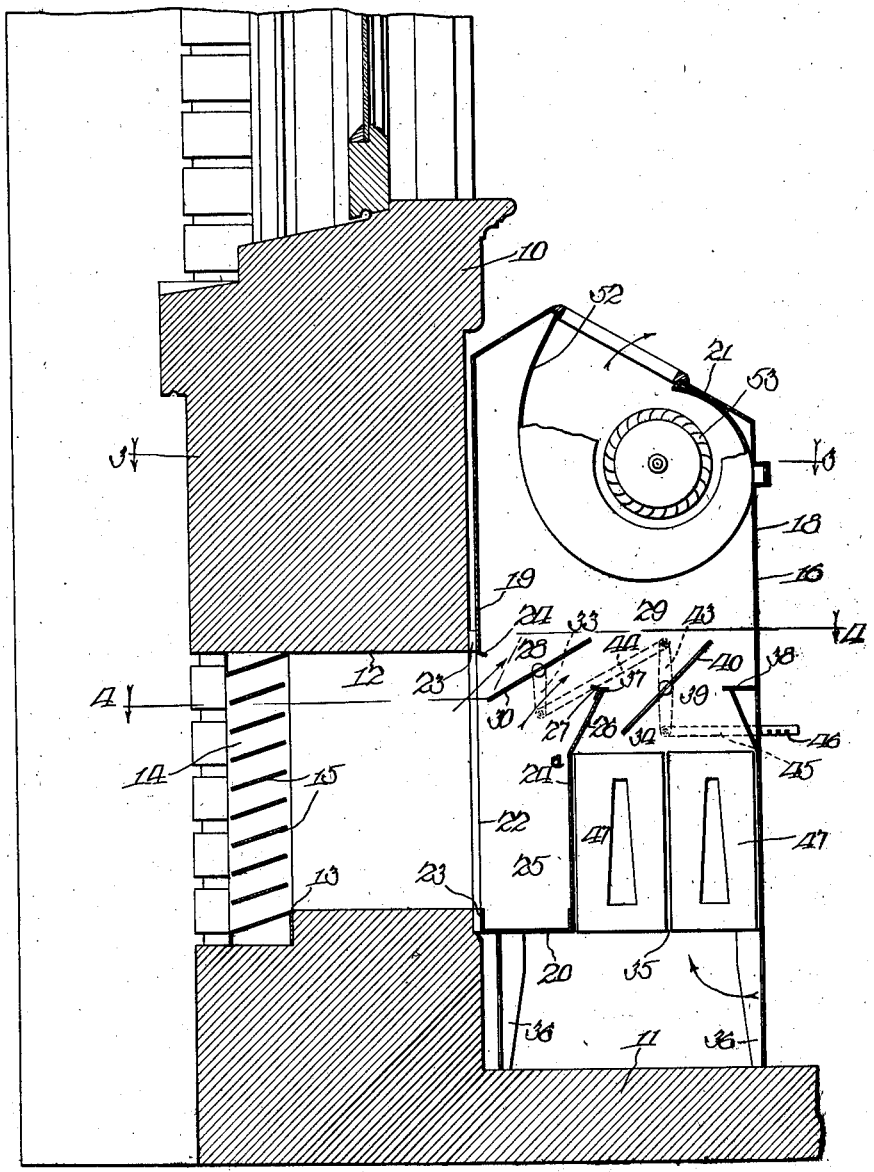

April 1, 1930.  G. E. OTIS  1,753,156

HEATING AND VENTILATING APPARATUS

Filed May 25, 1927  3 Sheets-Sheet 1

Inventor:
Gerald E. Otis
By George J. Haight
Atty.

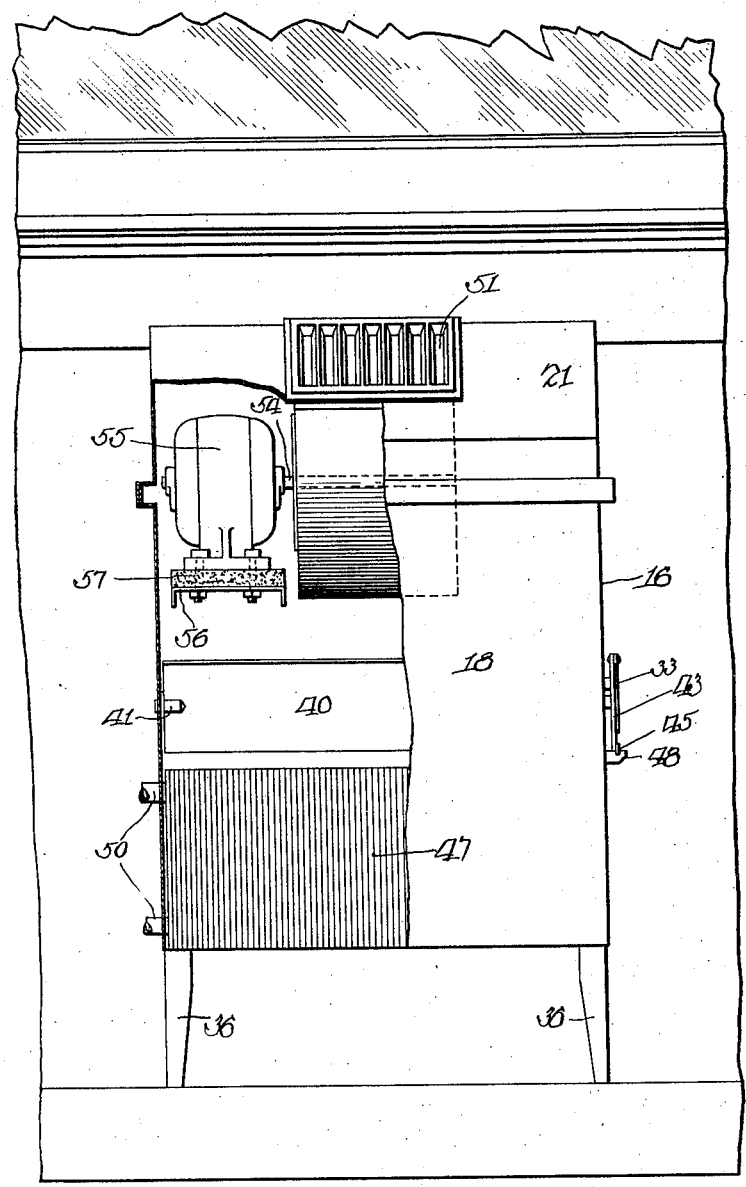

April 1, 1930. G. E. OTIS 1,753,156
HEATING AND VENTILATING APPARATUS
Filed May 25, 1927   3 Sheets-Sheet 3
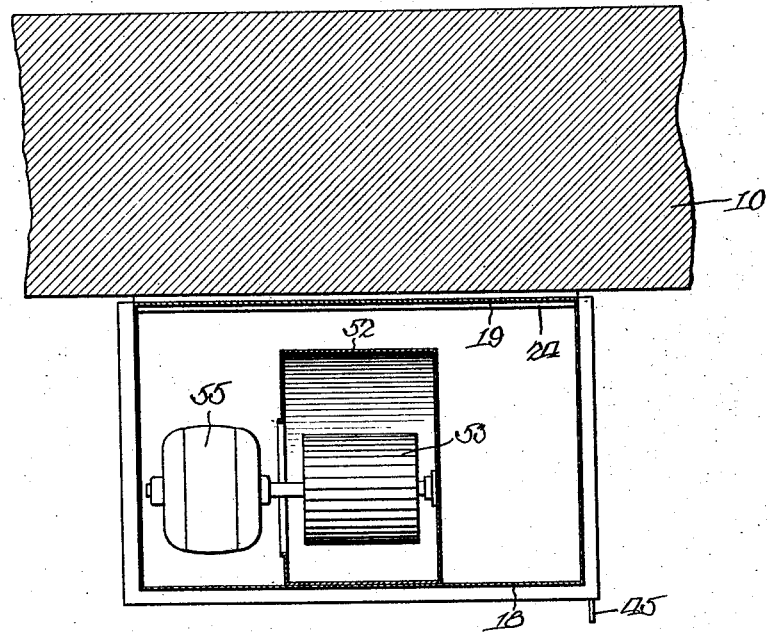
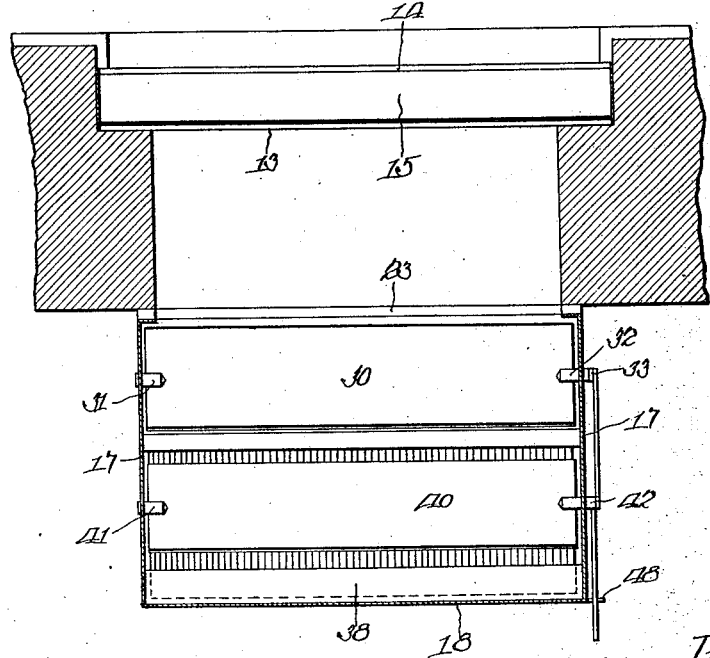
Inventor:
Gerald E. Otis
By George F. Haight
Atty.

Patented Apr. 1, 1930

1,753,156

UNITED STATES PATENT OFFICE

GERALD E. OTIS, OF MOLINE, ILLINOIS, ASSIGNOR TO THE HERMAN NELSON CORPORATION, OF MOLINE, ILLINOIS, A CORPORATION OF ILLINOIS

HEATING AND VENTILATING APPARATUS

Application filed May 25, 1927. Serial No. 193,979.

This invention relates to heating and ventilating apparatus.

It is now generally agreed by the engineering profession engaged in the art relating to heating and ventilating apparatus, that the necessity for ventilation in crowded rooms is primarily due to a gradual change in the physical characteristics of the atmosphere which affect the sensible temperature, and ventilation is a conditioning rather than a purifying process and consists in the maintenance of a uniform and agreeable sensible temperature, which is largely a heat regulating process. Sensible temperature is the resultant of three components, temperature, humidity and air motion, but the relation is known to be such that the combination may be satisfactorily controlled by proper regulation of the major component, temperature; however, temperature regulation alone involves the addition of heat according to weather conditions, the removal of heat occasioned by occupancy and other factors, and the maintenance of a proper balance. A proper heating and ventilating apparatus consequently must incorporate means for supplying heat as needed, means for removing excess heat, and means for properly regulating and maintaining a balance. The usual and customary means for supplying heat to a room or chamber, is by utilization of a steam or hot water radiator, and the most practical and efficient means for removing excess heat and maintaining balance is by the introduction of sufficient outside or fresh air to carry off the excess heat.

Heretofore the practice has been to provide a source of heat supply within an enclosure providing a passage communicating with the chamber to be heated, wherein the air which circulates from the chamber through the passage is directly subjected to the influence of the heat source. When the temperature in the chamber rises, in order to remove the excess heat, the practice has been to admit fresh air from outdoors into the passage and subject the outside air directly to the influence of the heat source, which pre-heats the air to a greater or less degree, after which the same is passed into the chamber to be heated. In this way, large volumes of pre-heated fresh air are required for no other purpose than to remove excess heat and maintain heat balance, and such procedure is objectionable since it entails the heating of a large fresh air supply over long periods, with consequent wasteful fuel expenditure. In addition, in structures of this character, in mild weather, it is impossible to regulate the temperature since the outside air necessarily passes through the heating unit, and the only way the temperature may be sufficiently reduced is by cutting off the heat from the heating unit, which requires additional time and trouble and also necessitates the consideration of an additional factor in properly controlling the temperature.

An important object of my invention is to provide a heating and ventilating apparatus in which outside fresh air is admitted only as required to control the sensible temperature and maintain heat balance, and wherein no preheating of the fresh air takes place, means being provided whereby the fresh air at outdoor temperatures is mixed with the air already heated by the heat source without preheating of the fresh air by the latter, thereby obviating the wasteful practice of unnecessarily heating large volumes of fresh air in the manner above pointed out, with a consequent saving in fuel expenditure, and additionally, in mild weather, outside fresh air may be admitted directly into the chamber to be heated hence doing away with the necessity of making adjustments of the heat source to cut off or increase the heat supply.

A further and more particular object of the invention is to provide an apparatus of the character referred to, which contemplates the utilization of two sources of air supply, one from within the chamber to be heated and ventilated, and the other from outdoors, in other words, fresh air at outdoor temperature, and in connection with which an arrangement of heating compartments, ports, and control mechanism is employed, whereby all of the air from the first or inside source of supply, and none from the second or outdoor source of supply, passes through the heating compartment of the apparatus, and the two sources of air supply are mixed at a point remote from the heat source in various relative amounts, or one or the other entirely cut off, according to the temperature requirements.

Another object of the invention is to provide in an apparatus of the character referred to, means for positively inducing discharge from the apparatus into the chamber to be heated, of both outside and inside air, without the necessity of pre-heating the air from the outside source by directing it over the heating source.

Other and further objects of the invention will more clearly appear from the description and claims hereinafter following.

In the drawings forming part of this specification, Figure 1 is a vertical sectional view through a portion of the outer wall of a building, and through the arrangement contemplated by my invention. Figure 2 is a fragmentary front elevational view of the wall shown in Figure 1, and a front elevational view of the heating apparatus contemplated by my invention, portions of the latter being broken away to expose the interior construction thereof. Figure 3 is a horizontal sectional view through the outer wall of the building, and the heating apparatus, said view being taken substantially on the line 3—3 of Figure 1. And Figure 4 is a horizontal sectional view of the invention taken substantially on the line 4—4 of Figure 1.

As shown in the drawings, 10 represents a fragment of a wall, in this instance an outside wall of a building, and 11 represents a fragment of the floor of the room or chamber to be heated. The wall 10 at a suitable distance above the floor 11 is provided with a duct 12 extending therethrough and communicating at one end, indicated at 13, with the outside atmosphere. The end 13 of the duct is provided with a metallic casing 14, having louvers 15 extending across the mouth of the duct 12 and serving to protect the opening against the ingress of undesirable material in inclement weather.

The duct 12 at its inner end communicates with the heating apparatus, which in the form of the invention here shown, comprises a housing or casing 16 of sheet metal or other suitable material, said housing being provided with vertical end walls 17—17, front wall 18, and rear wall 19, bottom wall 20 and top wall 21. The housing 16 is disposed adjacent the wall 10, and the rear wall 19 of said housing is provided with an inlet opening 22 communicating with the duct 12, and being substantially co-extensive with the size of the latter, there being suitable sealing material 23 surrounding said opening and interposed between the wall 19 and the adjacent surface of the wall 10. Along the upper edge of the opening 22 in the wall 19 of the housing 16 is an inturned flange 24 adapted to co-operate with a damper in a manner hereinafter referred to. The housing 16 is provided with a partition 24$^a$ at its lower end, which defines what may be termed the fresh air chamber 25 of the heating apparatus, said partition extending upwardly from the bottom of the heating apparatus, and having its upper extremity inclined toward the front wall 18 of the housing. The inclined portion 26 of the partition 24 is provided on its upper edge with an angular member 27 which co-operates with the flange 24 on the rear wall 19 to provide a fresh air port 28 through which the fresh air from the duct 12 and compartment 25 enters the central portion of the housing 16 which forms a mixing chamber 29. The passage of fresh air through the port 28 is controlled by means of a damper 30 which is pivotally mounted in the end walls 17—17 of the casing 16, by means of pins 31 and 32, the pin 32 at its outer end being provided with a crank 33 to which is connected mechanism for operating the damper 30 as hereinafter more particularly referred to.

The partition 24 in the bottom of the housing 16 is so located as to form with the front wall 18 of the housing a recirculating or heating compartment 34, the housing 16 having its lower wall 20 provided with an inlet opening 35 to the recirculating chamber 34, the opening 35 to the housing 16 being spaced a suitable distance upwardly from the floor 11 due to the fact that the housing 16 is supported upon the legs 36—36. The inlet opening 35 communicates with the air from within the room, and due to the fact that it is above the floor, easy access to the recirculating chamber 34 is afforded. The inclined portion 26 of the partition 24 is provided with an angular portion 37, and the front wall 18 of the housing 16 is provided with a bracket 38, the angular portion 37 and bracket 38 defining a port 39 discharging into the central portion or mixing chamber 29 of the housing 16. The port 39 is controlled by a damper 40 pivotally supported in the side walls 17—17 of the casing by means of pins 41 and 42, the pin 42 being provided with a lever 43, one end of which is connected by a link 44 with the crank 33 on the damper 30, while the other arm of the lever is connected to a link 45 having a rack 46 on its outer end adapted to cooperate with a fixed portion 48 on the housing, for holding the link 45 in adjusted position, reciprocation of the link 45 serving to effect simultaneous movements of the dampers 30 and 40. It should be noticed that the arrangement is such that when the link 45 is operated in a direction to close the damper 40, movement in an opposite, or in an opening direction, is transmitted to the damper 30, and when the link or operating member 45 is operated in the reverse direction, a reverse movement will take place, that is, closing of the damper 30 will result in opening of the damper 40. Mounted in the heating or recirculating chamber 34 are radiators 47—47, which are provided with suitable pipes 50 for conveying steam thereto.

The top wall of the housing 16 is provided with a grill 51 forming an outlet into the room to be heated, and communicating with the grill is a housing 52 in which is mounted a fan 53 adapted to draw the air from the chamber 29 and discharge the same through the grill opening 51. The fan 53 is mounted upon the armature shaft 54 of a motor 55 which is clamped upon a shelf 56 secured by suitable means to the walls of the housing 16, there being a block of cushioning material 57 interposed between the base of the motor 55 and the shelf 56. Operation of the motor and revolution of the fan serve to draw or suck the air from the mixing chamber 29 so as to discharge the air through the grill opening 51.

In operation, when the temperature of the room in which the heating apparatus is located, is below normal, the damper 40 and the damper 30, will be respectively wide open and tightly closed, so that all of the air passing through the apparatus will be recirculated from the room or chamber, that is, the cool air from the room will enter the opening 35 in the bottom of the heating chamber 34, passing through the heating chamber 34, and passing thence into the mixing compartment 29, and being withdrawn from said compartment by the fan 53 and discharged outwardly through the opening 51, the damper 30 during this operation being tightly closed. During this operation, the temperature in the room rises, and in order to preserve a balance of temperature in the room, the damper 40 will be gradually closed while the damper 30 is gradually simultaneously opened to admit first some, and gradually more, atmospheric air from the duct 12, with a corresponding reduction in recirculation, until the proper balance is obtained and the temperature in the room is normal. After a normal temperature has been established, it can be maintained under fluctuating conditions of normal heat balance by moving the dampers one way or the other as required.

It particularly should be noted that at no time during the operation of the apparatus is it necessary to heat the fresh air which is admitted through the apparatus to maintain the heat balance, and further, in no instance is the fresh or cold air discharged by the fan against the radiators, as occurs in all other heating apparatus of which I have knowledge. During the operation of the apparatus the maximum utilization of the heat units generated by the radiators 47—47 is at all times obtained, and the radiators are not called upon to heat the fresh air before it enters the room, the fresh air being admitted to the room at a point remote from the heat source and mixed at said remote point with the overheated air in the room to remove the excess of heat therefrom. Employment of the invention does away with the necessity of heating excessive volumes of fresh air over long periods of time which necessitates the expenditure of excessive and wasteful quantities of fuel, the invention utilizing the fresh air only as a means of maintaining the normal heat balance without the preheating necessary in other constructions. Attention is also called to the fact that with the arrangement of compartments and dampers described there is no possibility of the fresh air flowing through the bottom room inlet as the suction of the fan maintains flow in the proper direction, but even if the fan is entirely omitted and the incoming fresh air should reverse its flow, it would have to pass through the heating chamber and be subjected to the heat from the radiators before passing into the room. In mild weather fresh air may be admitted directly to the chamber to be heated without being subjected to the heat source, and reduce the temperature without the necessity of regulating the degree of heat produced by the heat source.

While I have herein shown and described what I consider the preferred manner of carrying out the invention, the same is merely illustrative, and I contemplate all changes and modifications which come within the scope of the claims appended hereto.

I claim—

1. In a heating and ventilating apparatus adapted to be placed in a chamber to be heated, the combination with a source of heat supply; of means communicating with said source of heat supply and said chamber to provide a conduit for recirculation of heated air to and from said conduit and said chamber; means for controlling the sensible temperature in said chamber, said means being operable to introduce fresh air to said conduit so as to cause mixture of the fresh air with the recirculative air immediately subsequent to the subjection of the latter to the influence of the source of heat supply; means for positively inducing discharge of the mixed air into said chamber in a direction away from said heat source; and interconnected control elements for varying the proportions of fresh air and heated air passing through said apparatus.

2. In a unit ventilating and heating apparatus adapted to be placed in a chamber to be heated, the combination with a housing having an outlet opening at its top and an inlet opening at its bottom, both of said openings communicating with said chamber, and a second inlet opening into said housing and communicating with outside air at atmospheric temperature; of a partition in said housing cooperating with the bottom inlet opening and the outside inlet opening to provide independent fresh air and heating compartments; a source of heat supply disposed in said heating compartment; interconnected means for controlling the passage of air through said fresh air and said heating compartments; and a suction fan associated with the top outlet of said housing for inducing discharge of the air from said housing into said chamber.

3. A heating and ventilating apparatus adapted to be placed within a room to be heated, and including in combination, a housing having top and bottom walls and front and rear walls, said housing having a partition extending upwardly from the bottom wall thereof and dividing said housing into separate compartments, said bottom wall being provided with an inlet communicating with said chamber, and the other compartment being provided with an inlet communicating with outside air at atmospheric temperature, said partition terminating short of the top of said housing and defining a mixing chamber; a source of heat supply in said heating compartment; interconnected dampers for controlling the passage of air through said compartments; and a suction fan associated with an outlet in the top wall of said housing for inducing discharge of the air passing through said housing into said room.

4. In an air conditioning apparatus having a discharging orifice, an indoor air inlet, and an outdoor air inlet; of means for confining the air from the outdoor inlet and the air from the indoor inlet during the entire operation of the apparatus in separate non-communicating streams directed toward said orifice; a conditioning element located exclusively within the indoor air stream; means for controlling the stream of indoor air; and means for controlling the stream of outdoor air.

5. A conditioning apparatus adapted to be placed in a room to be atmospherically conditioned and having an outlet located in position to discharge air into the room and provided with an indoor-air conduit having its intake in communication with the interior of the room, and a fresh-air conduit cut off from communication with the indoor-air conduit, and having an intake orifice opening exteriorly of the room, both of said conduits being adapted to deliver air to the outlet communicating with the room, air conditioning means located within the indoor-air conduit and out of direct communication with the fresh-air conduit and adapted to condition the indoor-air admitted to and through said conduit, means for regulating the intensity of action of the conditioning means, means for regulating the volume of outside-air admitted through the fresh-air conduit, and means for securing unified operation between the control for the conditioning means and the control for the fresh-air conduit to cause said controls to act in opposition to one another to effect increased intensity of conditioning concurrently with restriction of fresh-air supply, and vice versa.

6. A conditioning apparatus adapted to be placed within a room to be atmospherically conditioned provided with an indoor-air inlet from the interior of the room and a fresh-air inlet opening exteriorly of the room, air conditioning means located within said apparatus, controlling means for regulating the intensity of the conditioning means, controlling means for regulating the admission of cold air to the apparatus, and means for unifying the action of said respective controlling means to effect increase in the volume of outdoor fresh air passing through said apparatus concurrently with restriction of the intensity of the conditioning means, and vice versa.

7. A heating and ventilating apparatus to be placed in a room to be heated, and comprising a housing having an outlet adjacent its top communicating with said room and having an inlet adjacent its bottom also communicating with said room, said housing being also provided with a second inlet communicating with a source of outside air supply, means providing conduits for separately conducting the indoor and outdoor air toward said outlet, said means being interposed between said outdoor inlet and said indoor inlet, the indoor air conduits affording a passage communicating with the outdoor air conduit at its discharge end within said apparatus, and with the indoor air conduit at its intake end; and a heating element disposed in said last named conduit and interposed between said indoor inlet and the point of communication of the conduit with said outdoor air conduit, whereby outdoor air accidentally drawn back into the indoor air conduit is heated before discharging into the room.

8. An apparatus of the character described to be placed in a room in which the air is to be conditioned, said apparatus comprising a casing having a heating element contained therein, said casing having a cold air inlet, an indoor warm air inlet, and an outlet adapted to discharge into said room, means within said casing for causing the forced discharge of the air from said casing through said outlet into said room; and interconnected means coincidentally operable to admit cold air as the flow of heat from said heating element is restricted, and to restrict entrance of cold air as the flow of heat is increased.

In witness that I claim the foregoing I have hereunto subscribed my name this 20th day of May, 1927.

GERALD E. OTIS.